(12) United States Patent
Jogikalmath et al.

(10) Patent No.: US 10,364,532 B2
(45) Date of Patent: Jul. 30, 2019

(54) PROCESSES FOR CLAY EXFOLIATION AND USES THEREOF

(71) Applicant: NANOPAPER, LLC, Cambridge, MA (US)

(72) Inventors: Gangadhar Jogikalmath, Cambridge, MA (US); Andrea Schneider, Hyde Park, MA (US); David S. Soane, Chestnut Hill, MA (US)

(73) Assignee: Crop Enhancement, Inc., San Jose, CA (US)

( * ) Notice: Subject to any disclaimer, the term of this patent is extended or adjusted under 35 U.S.C. 154(b) by 1203 days.

(21) Appl. No.: 14/457,591

(22) Filed: Aug. 12, 2014

(65) Prior Publication Data

US 2015/0075740 A1  Mar. 19, 2015

Related U.S. Application Data

(63) Continuation of application No. PCT/US2013/026084, filed on Feb. 14, 2013.

(60) Provisional application No. 61/598,659, filed on Feb. 14, 2012.

(51) Int. Cl.
  *D21H 17/68* (2006.01)
  *B01J 39/02* (2006.01)
  *D21H 17/66* (2006.01)
  *D21H 17/67* (2006.01)

(52) U.S. Cl.
  CPC ............ *D21H 17/68* (2013.01); *B01J 39/02* (2013.01); *D21H 17/66* (2013.01); *D21H 17/675* (2013.01)

(58) Field of Classification Search
  None
  See application file for complete search history.

(56) References Cited

U.S. PATENT DOCUMENTS

| | | | |
|---|---|---|---|
| 3,461,032 | A | 8/1969 | Lichtenberger |
| 3,508,952 | A | 4/1970 | Eykamp et al. |
| 3,654,263 | A | 4/1972 | Cescato |
| 3,833,467 | A | 9/1974 | Spiller |
| 5,552,469 | A | 9/1996 | Beall et al. |
| 5,672,555 | A | 9/1997 | Maxwell et al. |
| 6,383,282 | B1 | 5/2002 | Chaiko |
| 7,750,070 | B2 * | 7/2010 | Yang ............... B60C 1/0008 524/445 |
| 7,842,162 | B1 | 11/2010 | Lvov et al. |
| 2003/0187120 | A1 | 10/2003 | Chaiko et al. |
| 2005/0065266 | A1 | 3/2005 | Yang et al. |
| 2006/0148958 | A1* | 7/2006 | Haraguchi ........... C08K 3/346 524/445 |
| 2006/0287413 | A1* | 12/2006 | Lin ..................... C01B 33/12 523/216 |

(Continued)

*Primary Examiner* — Jacob T Minskey
(74) *Attorney, Agent, or Firm* — Elmore Patent Law Group, P.C.; Mahreen Chaudhry Hoda; Carolyn S. Elmore

(57) ABSTRACT

The present invention provides methods for producing exfoliated clay platelets from a swellable clay material. In embodiments, the method for producing exfoliated clay platelets includes providing an exfoliating agent comprising an anionic extractant, and exposing the swellable clay material to the exfoliating agent, wherein the exfoliating agent produces exfoliated clay platelets from the swellable clay material. Methods for treating paper precursors and paper sheets are also disclosed, as are paper products formed from such paper precursors or paper sheets.

5 Claims, 4 Drawing Sheets

(56) References Cited

U.S. PATENT DOCUMENTS

2009/0022649 A1* 1/2009 Zhamu .................. B82Y 30/00
423/415.1

* cited by examiner

PROCESSES FOR CLAY EXFOLIATION AND USES THEREOF

RELATED APPLICATIONS

This application is a continuation of International Application No. PCT/US13/26084, which designated the United States and was filed on Feb. 14, 2013, published in English, which claims the benefit of U.S. Provisional Application Ser. No. 61/598,659, filed Feb. 14, 2012. The entire contents of the above applications are incorporated by reference herein.

FIELD OF THE APPLICATION

This application relates generally to improvements in clay processing for uses in papermaking.

BACKGROUND

Besides cellulose fiber, clay is the most widely used material in the paper industry. Filler clays are used in the wet end to decrease fiber costs. In the size press, coating clays are used to deliver specific properties: brightness, smoothness, and gloss. The main difference between filler and coating clays is particle size: in order to achieve smaller particle size for coatings, clays are delaminated to micron-scale particles. Because of this chemical alteration, coating clays are generally more expensive than filler clays.

Clays used for coating paper can be characterized by the percentage of particles by weight that are within a certain size range, for example, within 2 microns equivalent spherical diameter. More expensive materials have a higher percentage of these smaller particles. It has been recognized in the art that smaller particles, by virtue of their greater breadth, thinness and surface area, can provide a number of advantageous features. The coating is smoother with the smaller particles. Printability is increased because the larger surface area permits increased ink uptake. Brightness is enhanced because the multiplicity of fresh, unstained surfaces produces high reflectivity.

Crude clay deposits, such as Georgia kaolins, contain micrometer-size particles, ranging in size from about 0.1 microns to 15 microns. Particles at the smaller end of this range tend to be plate-like in shape, with diameters about 6 to 10 times thickness. Larger particles comprise stacks of particles that adhere in a face-to-face manner, like a stack of coins. Larger, granular clay particles can be broken down into smaller, delaminated particles by splitting the layered stacks into thin, platey units. Clay is a naturally occurring mineral in the phyllosilicate category, consisting of aluminum silicate as a principal component, along with various other metals such as calcium, potassium and magnesium, with varying levels of water content. Clays are formed from alternating sheets of tetrahedral $SiO_4$ and octahedral $AlO_6$, with the two sheets forming a layer. If a layer includes only one silica sheet and one alumina sheet, it is termed a 1:1 clay. Kaolin is an example of such a clay. These layers are tightly attached through hydrogen bonding. If, on the other hand, a layer is made of three sheets, as a silica-aluminum-silica sandwich, the clay is termed a 2:1 clay. Layers are attached to each other by van der Waals forces. There is a gap of about 1 nm between the layers, called the "gallery," where various cations such as sodium, magnesium, calcium and lithium may reside. The smectite family of clays (montmorrilonite, hectorite, saponite) are 2:1 clays.

While delaminated clays offer advantages versus granular clays, especially for surface applications, both must be introduced into the papermaking process by using high loading volumes and high pressure calendaring. High clay loading leads to decreased mechanical properties such as Scott bond, Mullen, tensile strength and stiffness, as the clay mass interferes with the cellulose bonding in the paper product. High pressure calendaring is an energy-intensive process. There remains a need in the art to provide a clay additive product that offers the desirable features for finishing (smoothness, good ink uptake, brightness, etc.) at low additive levels with no inhibition of mechanical properties. It is further desirable that such an additive be deliverable in the size press as well as in a calendaring process. The size press application of clays leads to improved gloss, barrier properties and surface strength when the clay additive is used with a suitable binder. A smaller particle size, with increased surface area, can contribute to these advantageous properties.

Techniques to decrease particle size by breaking down the larger clay particles can be called delamination, while exfoliation processes break the clay particles into individual layers or clay platelets. Clays of interest for papermaking are typically classified either as kaolinite clays (1:1 clays, Kaolin as an example) and smectite clays (2:1 clays, Montmorillonites like Bentonite as an example). Traditionally, Kaolin clay is used as a filler in the wet-end to reduce cost of paper. Bentonite can be used as a microparticle retention system to enable high retention of fines, fibers and other additives in conjunction with a retention polymer.

Traditionally, the 1:1 clays, with their minimal interlayer distance, have been delaminated using mechanical means, such as ball mill grinding and extreme agitation. Following delamination, a polymeric dispersant must be used for the clay particles, which makes the retention of these particles difficult in the wet end. Moreover, the resulting particles are still not broken down to single-layer size: they are not fully exfoliated. The layers in the 2:1 clays are more readily separated, so are more amenable to exfoliation. For example, the intercalated cations allow for swelling within the gallery between the layers, so that the layers can be separated apart. Chemical or mechanical mechanisms can be used to exfoliate clays, with varying degrees of success.

Delaminated clays or exfoliated clays are highly desirable for this application owing to their high specific area and high aspect ratio. To improve the properties of clay additives, a variety of technologies have been utilized to improve upon the delamination process by detaching individual clay platelets from each other, a process termed exfoliation. Exfoliation can take place by physical or chemical processes to disrupt the attachment of the platelets to each other.

Traditional methods of exfoliation have utilized polymeric intercalating agents such as polyvinyl alcohol with swollen clay particles and then subjecting them to ultrasonication or similar high energy agitation. There remains a need, however, for quickly and inexpensively exfoliating the 2:1 clays to form stable suspensions for use in papermaking. Moreover, in papermaking, traditionally the clays are added either in the wet end or in the size press. Montmorillonite clays, for example, are traditionally used in wet-end as retention aids in conjunction with other polymers. For these uses, any exfoliated clay is desirably free of polymeric additives that might affect its interaction with the retention aids used in the papermaking process.

In addition, there remains a need to delaminate or exfoliate the clay particles into individual layers to enable better organization of clay platelets on paper surface leading to better barrier properties due to the tortuosity induced by the layered particles. The exfoliated clays also may reduce the need for supercalendering needed to orient and delaminate the clays resulting in a less dense but glossy sheet. There is also a need to keep the exfoliated clays suspended in aqueous solutions without using high molecular weight polymeric dispersants.

SUMMARY

Disclosed herein, in embodiments, are methods for producing exfoliated clay platelets from a swellable clay material, comprising providing an exfoliating agent comprising an anionic extractant, and exposing the swellable clay material to the exfoliating agent, wherein the exfoliating agent produces exfoliated clay platelets from the swellable clay material. In embodiments, the anionic extractant comprises sodium phosphate monobasic dihydrate. In embodiments, the exfoliating agent is formulated to have a basic pH. The exfoliating agent can comprise sodium hydroxide. In embodiments, the method can further comprise a step of applying ultrasonication simultaneous with or following the step of exposing the swellable clay material to the exfoliating agent. Also disclosed herein are paper products made in accordance with the aforesaid methods.

Further disclosed herein, in embodiments, are exfoliating formulations comprising an anionic extractant in a basic solution wherein the exfoliating formulation interacts with a swellable clay to produce exfoliated clay platelets. In embodiments, the formulation comprises a phosphate.

Also disclosed herein, in embodiments, are methods of treating a paper precursor comprising exfoliating a swellable clay material with an exfoliating formulation comprising an anionic extractant in a basic solution to produce a plurality of exfoliated clay platelets, and admixing the plurality of exfoliated clay platelets with the paper precursor. In embodiments, the step of admixing takes place in a wet end of a papermaking process. The method can comprise treating at least some of the plurality of exfoliated clay platelets with a cationic starch before admixing them with the paper precursor, or treating at least some of the plurality of exfoliated clay platelets with an amine-containing polycation before admixing them with the paper precursor, or treating at least some of the exfoliated clay platelets with an oil resistant coating formulation before admixing them with the paper precursor. In embodiments, at least some of the plurality of exfoliated clay platelets are associated with a latex formulation to form a latex-clay composite. Also disclosed herein are methods of treating a paper sheet comprising exfoliating a swellable clay material with the formulation disclosed above to produce a plurality of exfoliated clay platelets, and applying the plurality of exfoliated clay platelets with the paper sheet. In embodiments, the step of applying takes place in a size press of a papermaking process. Also disclosed herein are paper products made in accordance with the aforesaid methods.

DETAILED DESCRIPTION

Figure 1:
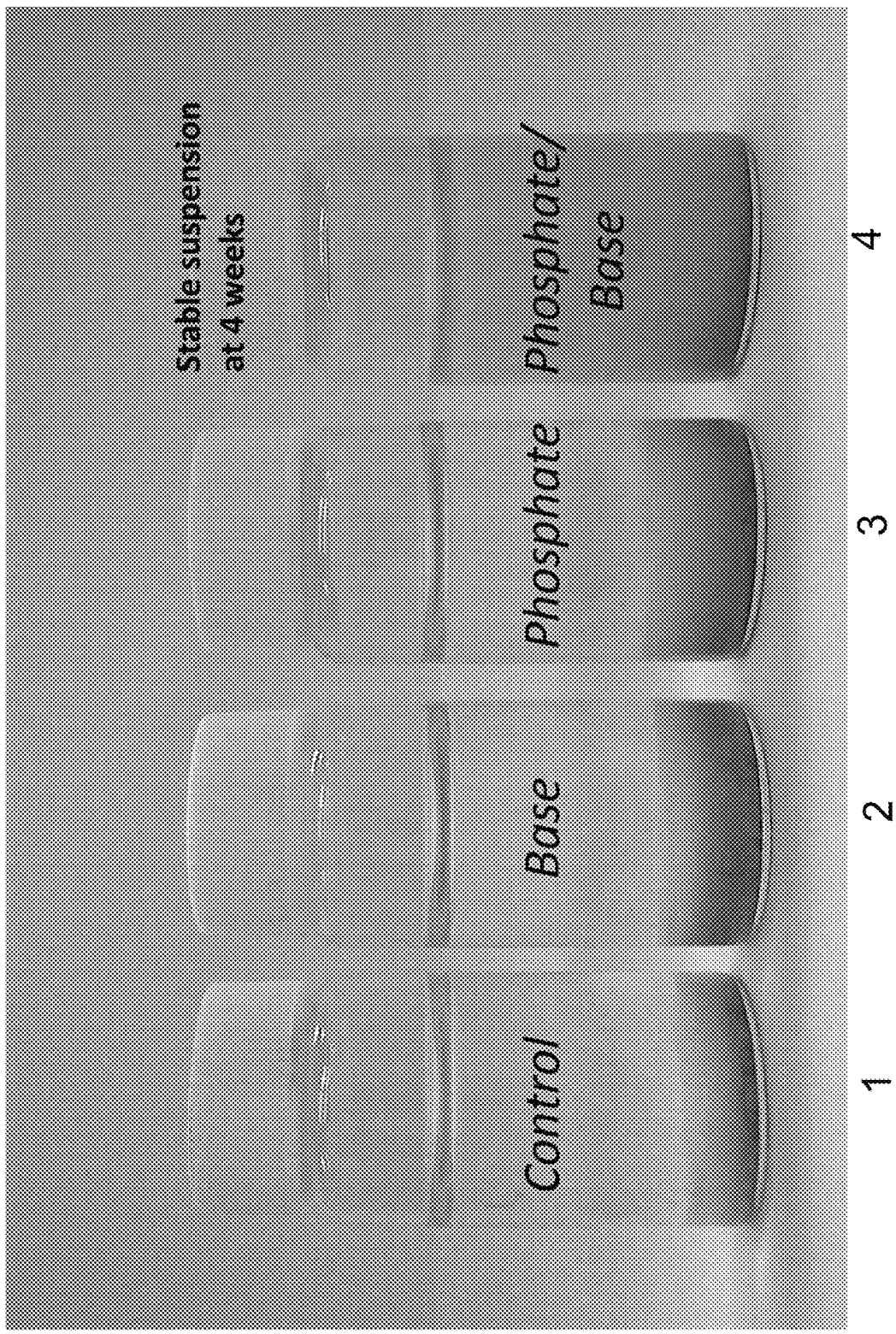
FIG. 1 shows visual inspection of exfoliated clay slurries (vs. control). The clay suspension containing Phosphate ions at high pH is stable over 4 weeks.

Clay is a naturally available for uses in papermaking and other industrial processes. The high aspect ratio of exfoliated clay also allows for economically feasible surface enhancement of clay—because less clay is being used overall, surface enhancement is efficient and will greatly improve surface properties of paper. Surface-enhanced exfoliated clay particles can be used for coatings to improve barrier (for example, oil and grease resistance and/or hydrophobicity) properties, modulate ink-paper properties, and impart high optical reflectivity. It has been unexpectedly discovered that formulations and methods as disclosed herein can provide for more complete exfoliation, resulting in significantly increased clay surface area and improved duration of aqueous suspension. Moreover, formulations can be prepared comprising exfoliated clay having advantageous properties. The method described here makes use of ionic intercalants and basic pH to separate the platelets and keeping them stable without the use of surfactants or polymer mediators, so that they are compatible with industrial processes such as papermaking where the presence of adscititious agents can be detrimental. Exfoliated clay prepared in accordance with these systems, formulations and methods is suitable for use in a number of important industrial applications.

1. Exfoliation Formulations and Methods

Disclosed herein, in embodiments are methods for exfoliating clay, in particular 2:1 clays (e.g., montmorillonites such as Bentonite), which are understood to be swellable clays. The 2:1 clays are considered swellable due to their ability to bind water in the interlamellar space (gallery) by the cations residing there. The ions residing in the interlamellar space are termed intercalated ions. By combining processes for swelling the clay with chemistry to extract the intercalated ions, the clay laminae can be separated, or exfoliated into individual nanolayers or platelets. In embodiments, an anion such as phosphate can be employed to extract the intercalated cation. For example, where the intercalated ions comprise calcium, phosphate is particularly effective for extraction processes because of its innate affinity for calcium. In one embodiment, the phosphate ions for extraction can be provided in a high pH medium, enabling development of electronegativity on all the functional groups on the clay surfaces.

While phosphate is especially advantageous when used with montmorillonite, other anions can be employed as well in accordance with the procedures described herein. Other extractants beside phosphate that are suitable for exfoliating clays are those capable of chelating intercalated cations via ionic interactions. For calcium cations, for example, exemplary extractants include citrates (such as sodium citrate, potassium citrate) and citric acid; phosphonic acids and phosphonates such as 2-Aminoethylphosphonic acid, Dimethyl methylphosphonate, 1-Hydroxy Ethylidene-1,1-Diphosphonic Acid, Amino tris(methylene phosphonic acid), Ethylenediamine tetra(methylene phosphonic acid), Tetramethylenediamine tetra(methylene phosphonic acid), Hexamethylenediamine tetra(methylene phosphonic acid), Diethylenetriamine penta(methylene phosphonic acid), Amino-tris-(methylene-phosphonic acid); chelators such as ethylenediaminetetraacetic acid, diethylenetriaminepentaacetic acid and derivatives of these acids, such as the Dow series of compounds such as VERSENE™ 100 chelating agent (which is an aqueous solution of tetrasodium ethylenediaminetetraacetate) and VERSENEX™ 80 chelating agent (which is an aqueous solution of the pentasodium salt of diethylenetriaminepentaacetic acid), and the like.

In embodiments, it has been observed that clays exfoliated as described herein form stable and durable aqueous suspensions, especially in high pH environments. Not to be bound by theory, it is postulated that the pH-sensitive charging of surface hydroxyls can be driven towards electronegativity in a high pH medium. This charge repulsion between exfoliated platelets leads to their long-term stability when suspended in a high pH solution.

As shown in the Figures, samples that have been treated in accordance with these formulations and methods remain more durably suspended than those that have been subjected to high-energy mechanical agitation (ultrasonication) without anion/base treatment. For example, FIG. 1 shows the amount of settling in the specimens after four weeks. As shown in these Figures, a suspension containing exfoliated clay platelets produced in accordance with these formulations and methods (Vial 4) remains stable longer than the control sample which is treated only with ultrasonication, or with phosphate or base treatment individually. It has been observed that suspensions produced by exfoliating clay using the phosphate/base chemistry disclosed herein remain stable for periods up to three months in the laboratory. The minimal settling of the exfoliated samples in solution is consistent with a high yield of exfoliation and a thorough separation of platelets.

Figure 2B:
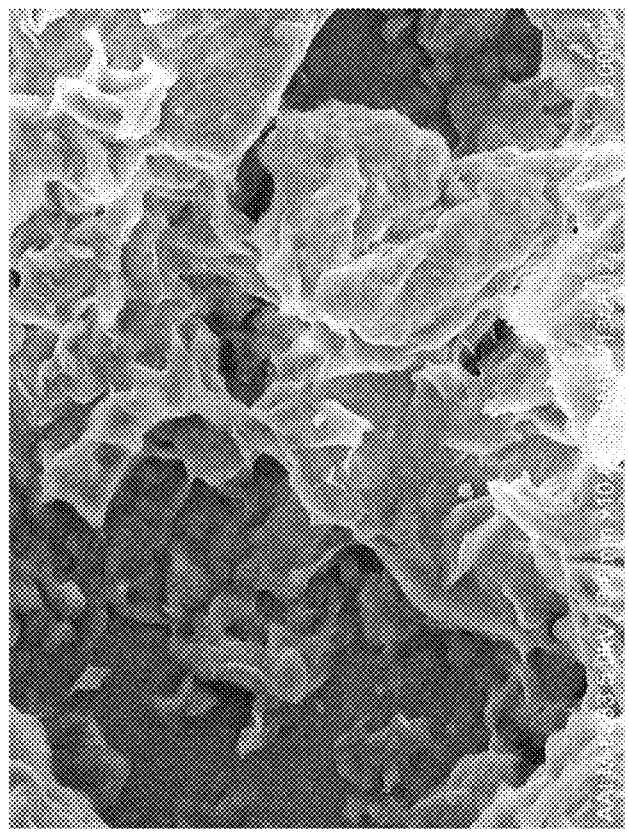
FIGS. 2A and 2B show SEM images of control montmorillonite samples subjected to sonication in water alone.
Figure 2A:
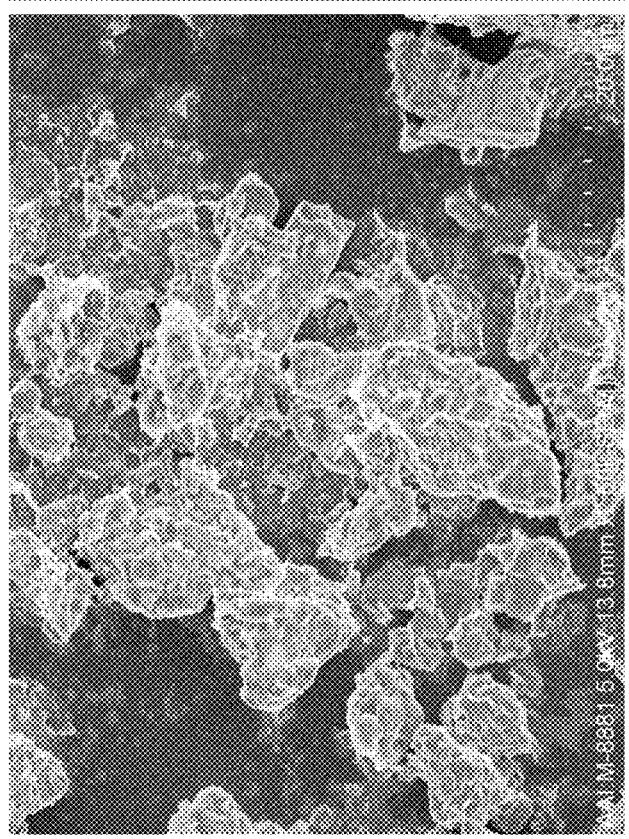
Figure 3B:
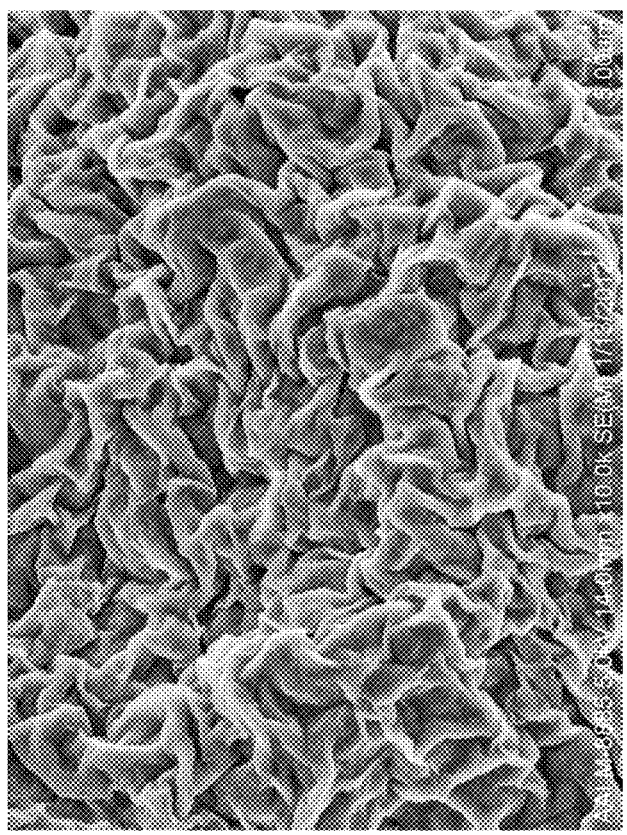
FIGS. 3A and 3B show the SEM images of montmorillonite samples exfoliated into layered nanoplatelets separated from each other.
Figure 3A:
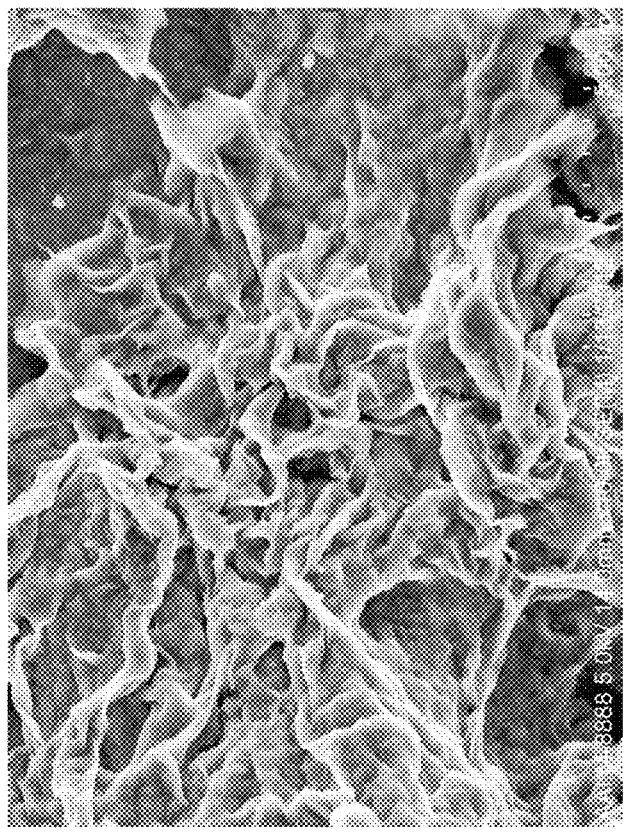

The scanning electron microscopy (SEM) images in FIGS. 2 and 3 show the microscopic differences between untreated (FIGS. 2A and 2B) and treated (FIGS. 3A and 3B) samples of montmorillonite. The images were obtained using a Hitachi Scanning Lectron Microscope at magnifications ranging from 2500× to 100,000× to elucidate the structure of the exfoliated and control clays. SEM of ultrasonicated but chemically untreated samples, shown in FIGS. 2A and 2B, reveals that the overall structure of the clay has not been changed by ultrasonication, and that the overall structure is preserved. The pictures show clay aggregates that remain intact despite the action of ultrasonication. No separation of individual platelets is seen.

SEM of the phosphate/base treated samples in FIGS. 3A and 3B shows that the random architectural arrangement of the unexfoliated clay has been disrupted and has been replaced by an ordered array of clearly separated platelet layers organized in a face-to-face pattern. The layers may consist of individual platelets or multi-platelet aggregates. A cross-sectional image of such a layer (FIG. 4) shows the thickness of one such platelet of 10 to 20 nm, within a multi-platelet stack.

2. Exfoliation Applications

Exfoliated clay produced in accordance with these formulations and methods can be used advantageously in papermaking A particular advantage is the use of anionic small molecules for exfoliation, which interact with the intercalated ions in such a way as to leave no residue upon the clay platelets leaving them amenable to other surface modification processes that might be employed subsequent to exfoliation. This advantage is of particular value in papermaking, where the presence of extraneous materials can interfere with other additives used in the processes. Moreover, the lack of polymeric residua allows the clay platelets to present a relatively pristine surface that is suitable for further processing or modification, for example, functionalization as described herein. The adaptability of these exfoliated clay platelets to various chemical modifications is useful for a number of industrial applications, including papermaking.

In embodiments, formulations comprising the exfoliated clay platelets prepared in accordance with these methods can be used to treat the paper precursors or to treat paper sheets, where the term "paper precursor" refers to the water-containing pulp mixture or paper-forming material at any point before the critical drying period when cellulose fibers begin to bond to each other to form paper sheets, and where the term "paper sheet" refers to a paper-forming material after critical drying where the cellulose fibers have bonded to each other.

In papermaking, for example, suspensions of exfoliated clay produced as described herein can be used in formulations for both wet-end application and size press applications, i.e. for paper precursors and paper sheets. In exemplary embodiments, the exfoliated clay suspensions can be treated with cationic starch to provide electrostatic binding and modification of the clay surface with starch. These modified particles can then be added to either the wet-end or at the size press. In another embodiment the residue-free exfoliated clay suspension can be mixed at high shear with a 1% solution of chitosan at low pH. Mixing with the basic clay solution can precipitate chitosan polymer on the surfaces of the exfoliated clay platelets, resulting in cationically modified clay platelets that can be further reacted with epoxy, anhydride and acid functionalities or used as is to enable better bonding between cationic groups on the clay and anionic cellulose fibers in the wet-end.

In another embodiment, aminated clay platelets (produced, for example, with chitosan deposition as previously described, although other mechanisms for amination can be employed) can be functionalized with a hydrophobic epoxy such as glycidyl-stearate to enable hydrophobic clay nanoparticles to be used as hydrophobic coating in the size press application, creating, for example, water-resistant papers. In an embodiment, the exfoliated clay can be functionalized with various oil resistant coating formulations such as aqueous solutions of cellulose derivatives such as methylcellulose, ethyl cellulose, propyl cellulose, hydroxypropyl methyl cellulose, hydroxyethyl methyl cellulose, ethylhydroxypropyl cellulose, and ethylhydroxyethyl cellulose, and cellulose acetate butyrate, which may further comprise polyvinyl alcohol and/or its derivatives, and the like. In other embodiments, other types of oil and grease resistant formulations comprising cationic latex emulsions can be mixed with anionically charged stable suspensions of exfoliated clay to yield composite particles bearing latex particles on their surfaces. Examples of such colloidal latex particles include those that are derived from latex emulsions such as the emulsions of polystyrene, styrene-acrylonitrile copolymer, carboxylated styrene-butadiene copolymer, ethylene-vinyl chloride copolymer, styrene-acrylic copolymer, polyvinyl acetate, ethylene-vinyl acetate copolymer, vinyl acetate-acrylic copolymer, and the like. Exfoliated clay platelets prepared in accordance with these formulations and methods and then coated with oil/grease resistant formulations as described herein can be added to the size press formulations such that the surface-modified clay forms a barrier layer on top of the paper sheet surface.

In other embodiments, exfoliated clay prepared in accordance with the methods disclosed herein can be used as vehicles to incorporate other colloidal particles in papermaking Due to their high aspect ratio, the clay platelets have higher retention in the paper compared to such colloidal particles, for example silica. By suitably modifying a colloidal particle, such as silica, it can be bound to the clay platelets as described herein, optionally with appropriate modification and/or functionalization. For example, the colloidal silica can be treated with a high molecular weight polyacrylamide or similar agent to create flocs of colloidal silica. The clay platelets can separately treated with a cationic polymer such as poly diallyldimethylammonium chloride (PDAC). So treated, the two modified particle systems can be brought together and mixed well to induce electrostatic aggregation, whereby the clay particles are now bound to colloidal silica. These composites can be used in papermaking, as would be appreciated by skilled artisans. The presence of silica, for example, improves ink-paper interaction by providing absorbent centers, a property which would be enhanced by combination with clay platelets to improve retention.

In other embodiments, pigment particles can be bound to clay platelets as prepared herein using similar methodologies. In one example, $TiO_2$ can be used. In other examples, intensely colored particulate pigments can be used. Pigment-clay composites can be used in papermaking either in the wet-end or in the size press.

EXAMPLES

Materials

In the Examples below, the following materials were used. Unless otherwise indicated, percentages in the Examples are weight percentages.

BASF Montmorillonite Clay—F100
Aldrich Montmorillonite clay
Sodium phosphate, monobasic dehydrate
Sodium hydroxide
Deionized water

Example 1: Preparation of Extractant Solution

A solution of 0.141% NaOH was prepared by adding 1.41 g NaOH to 1 L water and stirring to dissolve all NaOH (basic solution).

A solution of 0.274% $NaH_2PO_4.2H_2O$ was prepared by adding 2.74 g $NaH_2PO_4.2H_2O$ to 1 L of water and stirring to dissolve all $NaH_2PO_4.2H_2O$ (phosphate solution).

A solution of NaOH and $NaH_2PO_4.2H_2O$ was made so that for every two NaOH molecules there is one NaH2PO4.2H2O molecule. NaOH was chosen to be 0.0353 M, so NaH2PO4.2H2O was added to this solution at 0.0176 M. The resulting solution was 1.41 g NaOH and 2.74 g NaH2PO4.2H2O in 1 L of water (phosphate/base solution).

Example 2: Exfoliation of Montmorillonite Clays

For each clay sample (F100 and Aldrich), four vials were prepared. To begin, 300 mg of the clay sample was added to each of the four vials. 15 mL water was added to one of each vial for F100 and Aldrich clay. The remaining three sample vials were also suspended in 15 mL each of phosphate, phosphate/base and basic solutions prepared in accordance with Example 1. The vials were each shaken vigorously for 15 seconds and then placed into an ultrasonic bath (Model 75T Aquasonic by VWR Scientific Products) for 30 minutes. The ultrasonicated vials were allowed to settle for 1 hour and a photograph was taken. By this time, the water controls had completely settled. Pictures were then taken periodically to measure the amount of time the exfoliated clays were stably suspended in solution. After 28 days, the F100 and Aldrich clays exfoliated with phosphate/base solutions remained suspended, whereas the rest of the samples settled. Results are shown in FIG. 1.

Example 3: Microscopy of Exfoliated Clays

Microscopic images were captured with a Zeiss Axio microscope using an EC Epiplan-NEOFLUAR 20× objective lens and digitalized with an Axio MRC5 camera.

To begin preparation for microscopy slides, the as-sonicated clay samples from each of the vials described in Example 2 were deposited on a microscope slide for each condition and then subsequently dried. The dried clay was examined with the optical microscope.

Example 4: Scanning Electron Microscopy (SEM) Sample Preparation

Figure 4:
FIG. 4 shows a side view of an exfoliated montmorillonite clay platelet, prepared as described herein, showing a thickness of about 10-20 nm.

To begin preparation for SEM slides, the exfoliated clay and control samples prepared in accordance with Example 2 were shaken to homogenize the settled samples. Immediately afterwards, a 5 µL droplet from each sample was applied to a silicon wafer and then subsequently dried. The wafers were dried in an 80° C. oven for 5 minutes and then taken for testing. The samples were analyzed with a Hitachi Ultra FE SEM utilizing ultra-high resolution Field Emission Scanning Electron Microscopy. Results are shown in FIGS. 2 to 4.

Example 5: Preparation of Chitosan Solution

A chitosan solution of CG10 can be prepared by dispersing CG10 in deionized water and adding 1M HCl until the chitosan is dissolved. The final pH would be approximately 3.5. Chitosan solutions can then further diluted with deionized water to obtain the concentrations set forth in the Examples below.

Example 6: Preparation of Clays Coated with Chitosan

The clay exfoliated in accordance with Example 2 can be agitated in a beaker while the acidic Chitosan solution from Example 5 is added at 1% by weight of the clay in the slurry. The presence of basic pH in the clay solution would result in precipitation and attachment of the Chitosan molecules to the exfoliated clay surfaces. If necessary, a small amount of base can be further added to increase the pH of the slurry to ensure complete precipitation of Chitosan on the exfoliated clay surfaces. Such cationically modified exfoliated clays can be either added to the wet-end of papermaking or used in the size press application with a suitable binder such as starch.

Example 7: Surface Coating of Clay Particles with Latex

Exfoliated clay produced in accordance with Example 2 can be mixed with water to form a 1% exfoliated clay suspension. This suspension can then be mixed with a 1% by weight of 1% latex suspension (for example, Cationic latex such as BUTONAL® NS 198 or BUTONAL® NX 4190 from BASF). The appropriate latex is chosen such that the surface charge of the latex is cationic, to enable binding to anionic clay particles. After the latex is exhausted onto the surface of the clay particles in a 1:20 latex-to-clay ratio, a 0.1% by weight of 0.1% solution of Magnafloc LT30 in water can be added to this mixture to create flocs of latex/clay which can then be bound to cellulose fibers treated with a suitable cationic entity. In another embodiment, the clay/latex composite prepared according to this Example can be added to a sizing solution containing 8% by weight of gelatinized starch and used in the size press.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A method for producing exfoliated clay platelets from a swellable clay material, comprising:

provided an exfoliating formulation comprising an anionic extractant, wherein the exfoliating formulation has a basic pH, and wherein the anionic extractant is sodium phosphate monobasic dihydrate, and contacting the swellable clay material with the exfoliating formulation, wherein the exfoliating formulation produces exfoliated clay platelets from the swellable clay material.

2. The method of claim 1, wherein the exfoliating formulation comprises sodium hydroxide.

3. The method of claim 1, further comprising a step of applying ultrasonication simultaneous with or following the step of exposing the swellable clay material to the exfoliating formulation.

4. The method of claim 1, wherein the swellable clay material is a 2:1 clay.

5. The method of claim 4, wherein the swellable clay material is a montmorillonite.

* * * * *